(12) United States Patent
Tan

(10) Patent No.: US 8,514,586 B2
(45) Date of Patent: Aug. 20, 2013

(54) POSITIONING STRUCTURE FOR EXPANSION CARD

(75) Inventor: Wei Tan, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 142 days.

(21) Appl. No.: 13/211,747

(22) Filed: Aug. 17, 2011

(65) Prior Publication Data

US 2012/0320511 A1  Dec. 20, 2012

(51) Int. Cl.
*H05K 7/14* (2006.01)
*H05K 7/18* (2006.01)

(52) U.S. Cl.
USPC ...... 361/801; 361/679.41; 361/809; 361/759; 361/732

(58) Field of Classification Search
None
See application file for complete search history.

(56) References Cited

U.S. PATENT DOCUMENTS

| | | | | |
|---|---|---|---|---|
| D257,663 S | * | 12/1980 | McKee | D8/354 |
| 5,831,821 A | * | 11/1998 | Scholder et al. | 361/679.32 |
| 5,847,923 A | * | 12/1998 | Lee | 361/679.4 |
| 5,936,835 A | * | 8/1999 | Astier | 361/679.31 |
| 5,982,627 A | * | 11/1999 | Haughton et al. | 361/759 |
| D422,483 S | * | 4/2000 | Shea | D8/354 |
| 6,556,452 B2 | * | 4/2003 | Ruff | 361/759 |
| 6,597,581 B2 | * | 7/2003 | Barringer et al. | 361/756 |
| 6,704,205 B1 | * | 3/2004 | Chen | 361/740 |
| 6,741,459 B2 | * | 5/2004 | Imamura | 361/679.58 |
| 6,834,766 B2 | * | 12/2004 | Lin et al. | 211/41.17 |
| D618,085 S | * | 6/2010 | Lin et al. | D8/354 |
| 7,817,433 B2 | * | 10/2010 | Wu et al. | 361/747 |
| 2001/0053060 A1 | * | 12/2001 | Gan | 361/683 |
| 2002/0075638 A1 | * | 6/2002 | Chen | 361/683 |
| 2004/0136147 A1 | * | 7/2004 | Chen et al. | 361/679 |
| 2006/0181845 A1 | * | 8/2006 | Shah et al. | 361/685 |
| 2007/0030631 A1 | * | 2/2007 | Liang et al. | 361/600 |
| 2007/0042645 A1 | * | 2/2007 | Zhang et al. | 439/607 |
| 2009/0002960 A1 | * | 1/2009 | Liu et al. | 361/759 |
| 2009/0149056 A1 | * | 6/2009 | Ye et al. | 439/374 |
| 2010/0000690 A1 | * | 1/2010 | Yang | 160/127 |
| 2010/0103602 A1 | * | 4/2010 | Xue | 361/679.4 |
| 2011/0008659 A1 | * | 1/2011 | Okada et al. | 429/90 |
| 2011/0310583 A1 | * | 12/2011 | Chiu et al. | 361/809 |
| 2012/0020037 A1 | * | 1/2012 | Chiu et al. | 361/759 |
| 2012/0320547 A1 | * | 12/2012 | Tsai et al. | 361/759 |

\* cited by examiner

*Primary Examiner* — Adrian S Wilson
*Assistant Examiner* — Abhishek Rathod
(74) *Attorney, Agent, or Firm* — Altis Law Group, Inc.

(57) ABSTRACT

A positioning structure is used for mounting a expansion card to a printed circuit board. The positioning structure includes a first plate, a second plate and a connecting plate connected between the first plate and the second plate. The first plate defines a slot. The second plate defines an opening. The first plate is selectively mounted to different positions of the circuit board by the slot, and the second plate is selectively mounted to different positions of the expansion card by the opening.

10 Claims, 4 Drawing Sheets

POSITIONING STRUCTURE FOR EXPANSION CARD

BACKGROUND

1. Technical Field

The present disclosure generally relates to positioning structures, and particularly to a positioning structure for fixing an expansion card in a computer.

2. Description of Related Art

A video card, video adapter, graphics accelerator card, display adapter, or graphics card is an expansion card which generates output images to a display. In order to mount an expansion card to a motherboard in a computer, screws are used to mount the card in an expansion port of the motherboard.

However, expansion cards have been developed that provide many functions than previous and are thicker and heavier making it difficult to stably position the expansion card on the motherboard with screws.

Therefore, there is room for improvement within the art.

BRIEF DESCRIPTION OF THE DRAWINGS

Many aspects of the positioning structure for expansion card can be better understood with reference to the following drawings. The components in the drawings are not necessarily to scale, the emphasis instead being placed upon clearly illustrating the positioning structure for expansion card. Moreover, in the drawings, like reference numerals designate corresponding parts throughout the several views.

DETAILED DESCRIPTION

Figure 1:
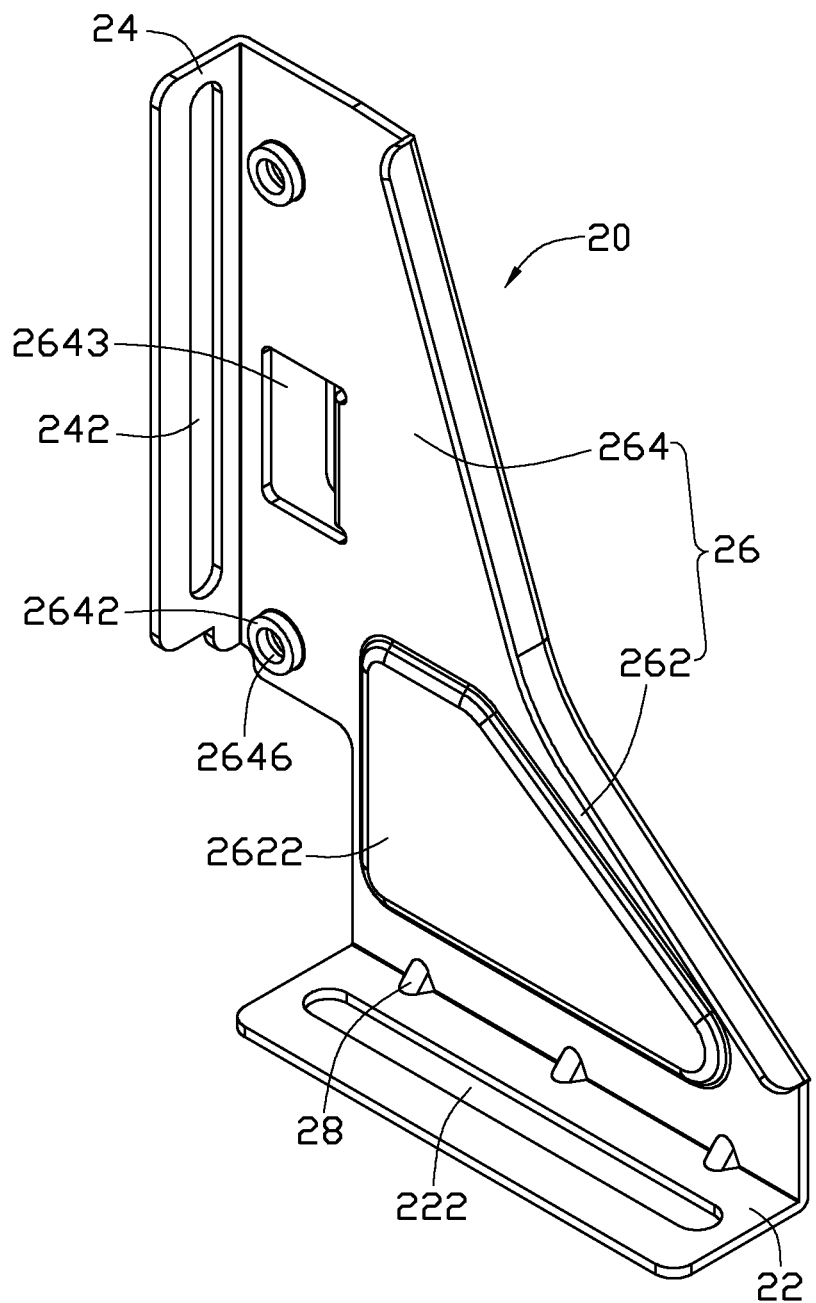
FIG. 1 is a schematic view of a positioning structure according to an exemplary embodiment.
Figure 2:
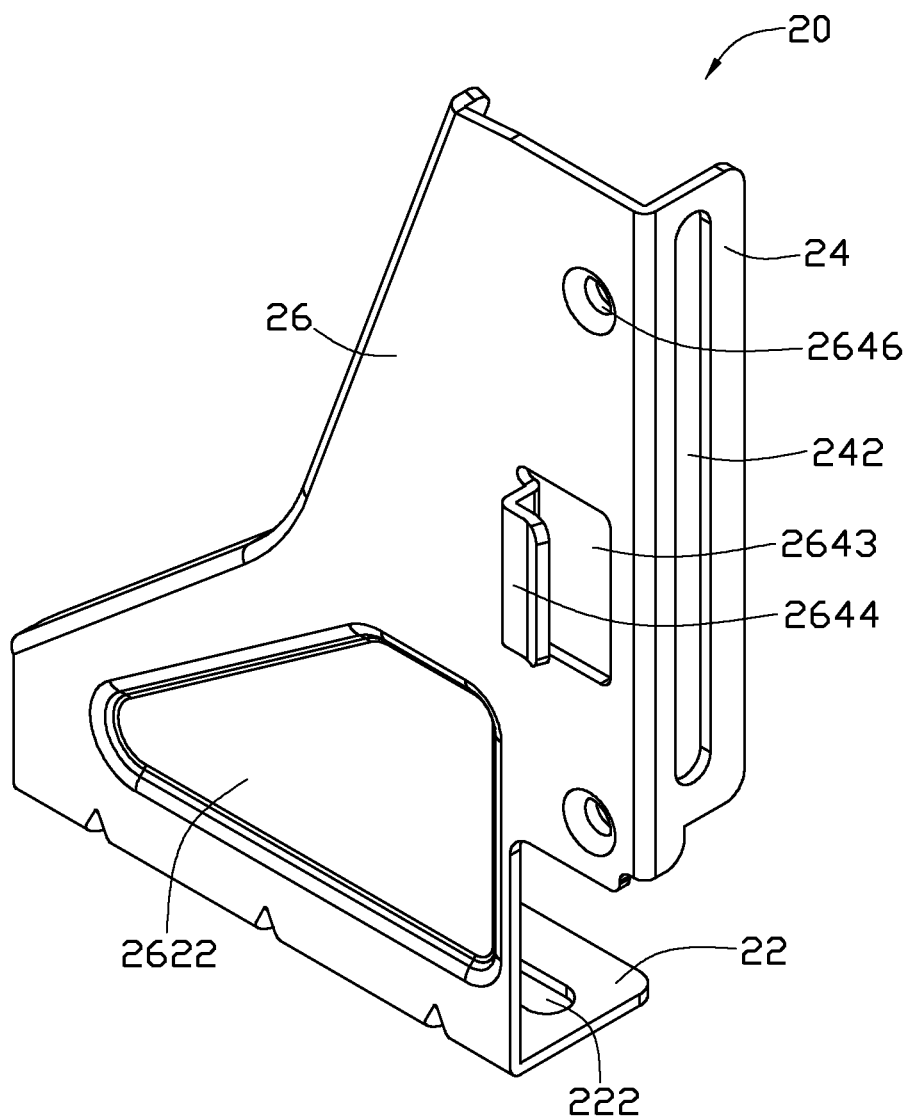
FIG. 2 is similar to FIG. 1, but shown from another aspect.

FIGS. 1 to 4 show an exemplary embodiment of a positioning structure 20 for fixing an expansion card 30, such as a video card, to a printed circuit board 10, such as a motherboard, applied in a computer. The video card 30 and the motherboard 10 are an exemplary application for the purposes of describing details of the positioning structure of an exemplary embodiment.

The positioning structure 20 is a metal plate that may be stamped or punched from a metal sheet. The positioning structure 20 includes a first plate 22, a second plate 24 and a connecting plate 26 connected between the first plate 22 and the second plate 24. In this exemplary embodiment, the first plate 22 extends from one end of the connecting plate 26, and is at an approximately 90 degree angle to the connecting plate 26. The second plate 24 extends from another end of the connecting plate 26, and is at an approximately 90 degree angle to the connecting plate 26 and also at a 90 degree angle to the first plate 22. The first plate 22 defines a long slot 222 for fixing the first plate 22 to the motherboard 10 with a screw 40. The second plate 24 defines a long opening 242 for fixing the second plate 24 to the video card 30 with a screw 50.

The connecting plate 26 includes a first portion 262 and a second portion 264 connected to the first portion 262. The first portion 262 is connected to the first plate 26. A trapezoid protruding block 2622 protrudes from the first portion 262 of the connecting plate 26 for reinforcing the connecting plate 26. A plurality of reinforcement portions 28 are formed at a junction of the first plate 22 and the first portion 262. Two mounted seats 2642 are formed on the second portion 264. Each mounted seat 2642 defines a threaded hole 2646 for connecting the connecting plate 26 to the video card 30. The second portion 264 defines a hole 2643. A clamping arm 2644 is formed between the mounted portions 2642, and extends from the hole 2643. The clamping arm 2644 engages with the connecting plate 26 to clamp one portion of the video card 30.

Figure 3:
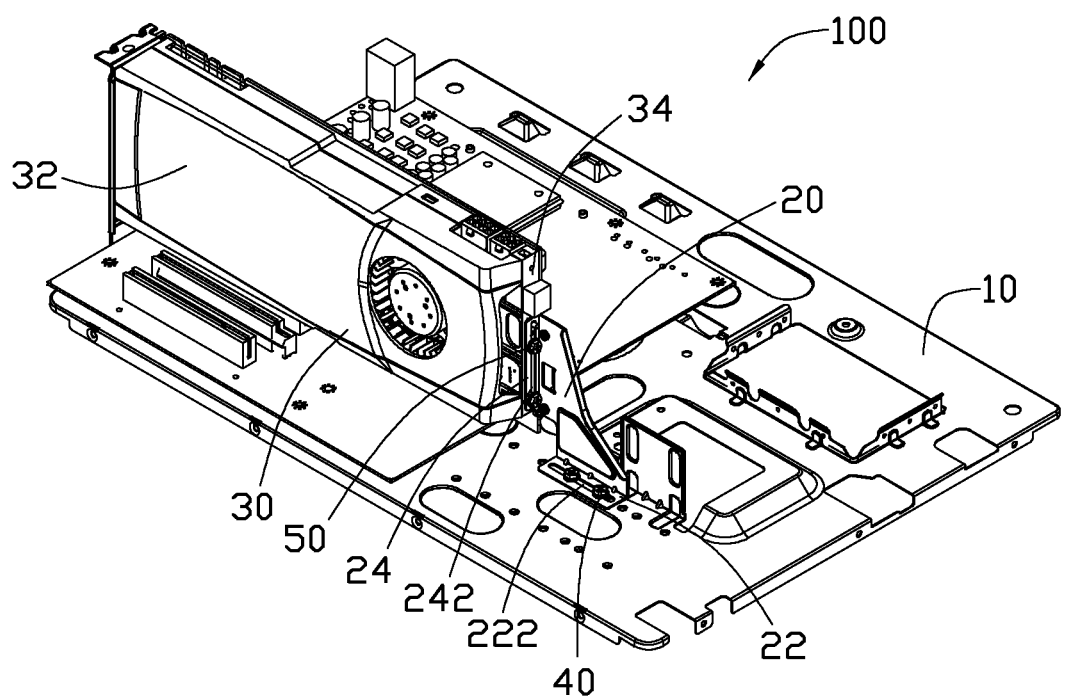
FIG. 3 is a schematic view of the positioning structure applied in a computer.

Referring to FIG. 3, the video card 30 includes a main body 32 and a display circuit board 34 connected together.

In assembly, the video card 30 is placed on the motherboard 10, and is inserted into a socket slot of the motherboard 10. The positioning structure 20 is positioned at one side of the video card 30. The screw 40 extends through the slot 222 to be fixed to the motherboard 10. The screw 50 extends through the opening 242 to be fixed to the video card 30. Accordingly, the main body 32 of the video card 30 is mounted to the motherboard 10. Since the first plate 22 and the second plate 24 support the video card from different directions, the video card 30 is stably secured.

Figure 4:
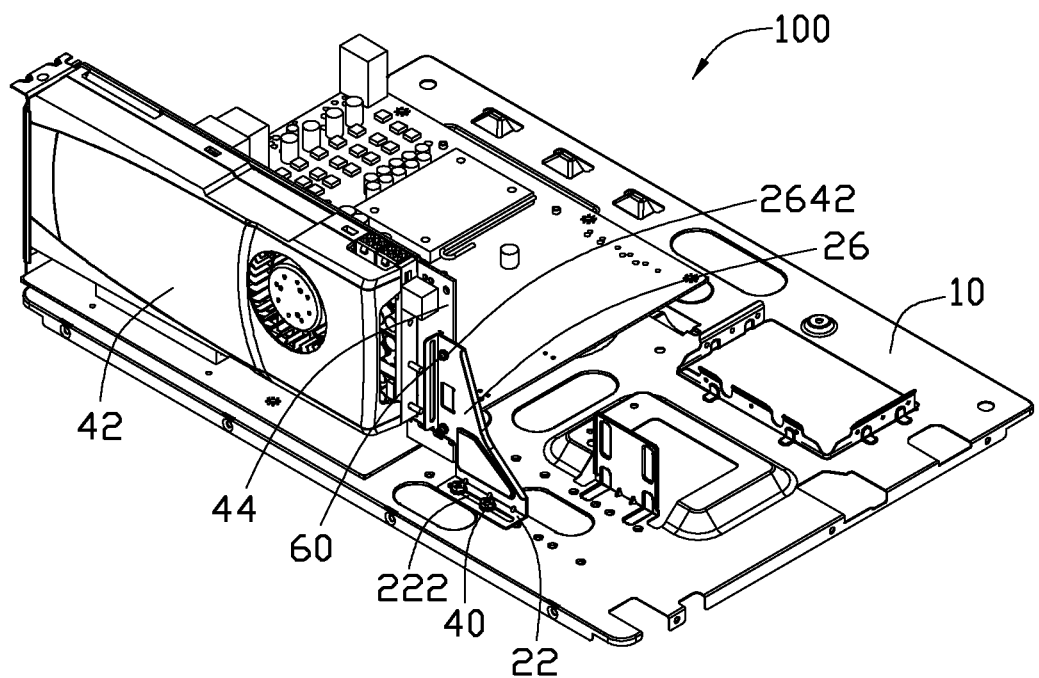
FIG. 4 is similar to FIG. 3, but shown from another aspect.

When another video card 40 larger than the video card 30 is used, referring to FIG. 4, the first plate 22 of the positioning structure 20 may be adjusted to a suitable position relative to the video card 40, and the display circuit board 44 of the video card 40 may be clamped between the arm 2644 and the connecting plate 26. The connecting plate 26 is mounted to the display circuit board 44 by the engagement of screws 60 in the threaded holes 2646 of the mounted portions 2642. The plate 20 provides the arm 2644 and the mounted portions 2642 to satisfy various positioning requirements.

A significant advantage of the positioning structure is that the plate 20 is easily assembled to the motherboard 10 and adjusted to receive different size video cards. This simplifies mounting of expansion cards. In addition, the positioning structure may provide a more stable connection for the video cards 30, 40.

It is to be understood, however, that even through numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A positioning structure for mounting an expansion card to a printed circuit board, the positioning structure comprising:
   a first plate defining a slot;
   a second plate defining an opening;
   a connecting plate connected between the first plate and the second plate, the first plate extending from a first end of the connecting plate, the second plate extending from a second end of the connecting plate, the first plate spaced from the second plate, wherein the first plate is selectively mounted to different positions of the circuit board by the slot, and the second plate is selectively mounted to different positions of the expansion card by the opening;
   wherein the positioning structure is made of a metal sheet, the connecting plate includes a first portion and a second portion connected to the first portion, the first portion is connected to the first plate, and the second portion is connected to the second plate, two symmetrical mounted portions are formed on the second portion, each mounted portion defines a threaded hole for connecting the connecting plate to the expansion card, the second portion defines a hole, a clamping arm is formed between the mounted portions, and extends from the hole, and the clamping arm engages with the connecting plate to clamp one portion of the expansion card.

2. The positioning structure as claimed in claim 1, wherein the first plate is at an approximately 90 degrees angle to the connecting plate.

3. The positioning structure as claimed in claim 2, wherein the second plate is at an approximately 90 degrees angle to the connecting plate.

4. The positioning structure as claimed in claim 3, wherein the first plate and the second plate are at an approximately 90 degree angle.

5. The positioning structure as claimed in claim 1, wherein a protruding block protrudes from the first portion of the connecting plate for strengthening the connecting plate.

6. The positioning structure as claimed in claim 1, wherein a plurality of reinforcement portions are formed a junction of the first plate and the first portion.

7. A computer comprising:
   a printed circuit board;
   an expansion card inserted into a socket of the printed circuit board;
   a positioning structure comprising:
      a first plate defining a slot;
      a second plate defining an opening; and
      a connecting plate connected between the first plate and the second plate, the first plate extending from a first end of the connecting plate, the second plate extending from a second end of the connecting plate, the first plate spaced from the second plate;
   wherein the first plate is selectively mounted to different positions of the printed circuit board by the slot from a first direction, and the second plate is selectively mounted to different positions of the expansion card by the opening from a second direction different from the first direction;
   wherein the positioning structure is made of a metal sheet, the printed circuit board is a motherboard, the printed circuit board is a motherboard, the connecting plate includes a first portion and a second portion connected to the first portion, the first portion is connected to the first plate, and the second portion is connected to the second plate, the first plate is fixed to the motherboard through at least one screw received in the slot, the second plate is fixed to the expansion card with another at least one screw, two symmetrical mounted portions are formed on the second portion, each mounted portion defines a threaded hole for connecting the connecting plate to the expansion card, the second portion defines a hole, a clamping arm is formed between the mounted portions, and extends from the hole, and the clamping arm engages with the connecting plate to clamp one portion of the expansion card.

8. The computer as claimed in claim 7, wherein a protruding block protrudes from the first portion of the connecting plate for strengthening the connecting plate.

9. The computer as claimed in claim 7, wherein a plurality of reinforcement portions are formed a junction of the first plate and the first portion.

10. A computer comprising:
    a motherboard;
    a video card inserted into a socket of the motherboard, and including a main body and a display circuit board connected to each other;
    a positioning structure comprising:
       a first plate defining a slot;
       a second plate defining an opening; and
       a connecting plate connected between the first plate and the second plate, the first plate extending from a first end of the connecting plate, the second plate extending from a second end of the connecting plate, the first plate spaced from the second plate, the connecting plate including a clamping arm;
    wherein the first plate is selectively mounted to different positions of the motherboard by the slot from a first direction, and the second plate is selectively mounted to different positions of the main body of the video card by the opening from a second direction different from the first direction, the display circuit board of the video card is clamped between the clamping arm and the connecting plate, and the connecting plate is mounted to the display circuit board of the video card.

\* \* \* \* \*